United States Patent [19]
Donohue et al.

[11] 3,934,182
[45] Jan. 20, 1976

[54] SYNCHRONIZING APPARATUS

[75] Inventors: James M. Donohue; Joseph R. Kramer; Victor Rodek, all of Rochester, N.Y.

[73] Assignee: Xerox Corporation, Stamford, Conn.

[22] Filed: Nov. 16, 1970

[21] Appl. No.: 89,869

[52] U.S. Cl. ............................ 318/85; 318/85 X
[51] Int. Cl.² ..................................... H02P 5/50
[58] Field of Search ................ 318/74, 98, 85, 685

[56] References Cited
UNITED STATES PATENTS

| | | | |
|---|---|---|---|
| 2,848,671 | 8/1958 | McDonald | 318/85 X |
| 3,064,173 | 11/1962 | Breen et al. | 318/85 X |
| 3,408,549 | 10/1968 | Shimabukuro | 318/85 |
| 3,430,148 | 2/1969 | Miki | 318/85 X |

*Primary Examiner*—H. Dobeck
*Attorney, Agent, or Firm*—J. J. Ralabate; T. J. Anderson; I. Keschner

[57] ABSTRACT

Synchronizing apparatus is disclosed in accordance with the teachings of the present invention wherein the operation of a first device is regulated in accordance with the operation of a second device. The phase relationship between signals representing the operation of the first and second devices, respectively, is determined by comparison means which produces a pulse width modulated signal indicative of said phase relationship. Control signal generating means responds to the pulse width modulated signal to generate an analog signal having an amplitude established by said phase relationship. Feedback means, including variable frequency generating means, is controlled by the analog signal to modify the operation of the first device whereby said first device is urged into a synchronous relationship with said second device and the signals representative of the operation of said first and second devices admit of a desired phase relationship.

4 Claims, 4 Drawing Figures

SYNCHRONIZING APPARATUS

This invention relates to apparatus for regulating the operation of a first device in accordance with the operation of a second device and, in particular to apparatus for synchronizing the production of a first signal with that of a second signal.

The desirability of maintaining a rigid synchronous relationship between two or more operating devices is common to many applications such as an industrial assembly line, web combining techniques, photographic processing, switching devices, and the like. A basic requirement of each of these applications is to sustain a constant relationship between the operating characteristics, such as speed, of critical devices. For example, in an industrial assembly line, the speed of a transporting conveyor belt must bear a fixed and unvarying relationship with respect to the operating speeds of the processing machines that act in a cooperative manner therewith. Failure to maintain this relationship results in misalignment of component parts and impairment of the assembly line. Consequently, if the speed of the conveyor belt varies because of the effects of loading or external factors, the speed of the processing machines must be varied in a corresponding manner.

Similarly, where a plurality of webs are to be combined, as in a newspaper or magazine printing press, the association of a pre-printed web with a main web must be accomplished with a minimal amount of misregistration. However, spacings between the indicia on the pre-printed web might differ slightly from the spacings between indicia on the main web, causing a slight error in alignment that would be rapidly cumulative and readily noticeable. Hence, the speed of insertion of the pre-printed web must be precisely regulated to obviate this error. Likewise, when a photographic print on a strip of positive film is to be made from an image prerecorded on negative film, movement of the two strips must be synchronized. In many instances the negative, which has been processed, has experienced a slight degree of shrinkage, thereby altering the relationship between the picture areas. It is necessary, then, to alter the velocity of one or both of the strips to re-establish that relationship. Additionally, if the sound and picture of sound films are recorded on separate carriers, it is essential that reproduction of the sound and the picture, or display thereof, be synchronized.

The prior art has attempted to synchronize the operating speeds of cooperating devices by utilizing a common source of motive power. Various speeds are ascertained by providing different speed reducing driving gear ratios between the single motor which comprises the source of motive power and each device. This technique suffers from the disadvantages of being economically prohibitive and inflexible. A high torque, constant velocity motor capable of driving each device for prolonged periods of time and highly durable gears exhibiting minimal backlash must be employed. Adoption of this arrangement provides fixed speed ratios between the operating devices which ratios cannot be altered unless the individual gears of the speed reducing gears are replaced. In addition, the introduction of an infinitesimal synchronization error cannot be eliminated and rapidly becomes cumulative. To overcome these disadvantages particular electromechanical synchronizing systems have been designed for specific applications. Relatively few of these systems, however, are adaptable for universal service. Thus, a system that successfully synchronizes the speed of a first mechanical device with the speed of a second mechanical device meets with failure when attempting, for example, to synchronize the speed of various peripheral devices with the operation of an electronic digital computer.

Therefore, it is an object of the present invention to provide apparatus for synchronizing the operation of a first device in accordance with the operation of a second device.

It is another object of this invention to provide apparatus for regulating the production of a signal by first signal producing means in accordance with a signal produced by second signal producing means.

It is a further object of this invention to provide phasing apparatus for eliminating a relative phase difference between a plurality of signals.

It is yet another object of this invention to provide apparatus for regulating the velocity of a first moveable member in accordance with the velocity of a second moveable member.

A further object of this invention is to provide apparatus for synchronizing the operating speeds of a plurality of devices having variable speed ratios therebetween.

Still another object of the present invention is to provide apparatus for synchronizing the alignment of a moveable member.

Various other objects and advantages of the invention will become clear from the following detailed description of exemplary embodiments thereof, and the novel features will be particularly pointed out in connection with the appended claims.

In accordance with this invention, apparatus for synchronizing the production of a first signal in accordance with the production of a second signal is provided wherein said first and second signals are applied to phase comparison means, said phase comparison means being adapted to generate signals indicative of the phase relationship between said first and second signals; the signals generated by the phase comparison means are applied to control signal generating means whereby an analog signal having an amplitude representative of said phase relationship is generated and feedback means responds to said analog signal to modify the production of said first signal such that said first signal admits of a desired phase relationship with respect to said second signal. If the first and second signals represent the velocities of first and second moveable members, the feedback means may include an electric motor for imparting a velocity to said first moveable member such that the speed of said electric motor is dependent upon said analog signal whereby the velocity of said first moveable member is synchronized with the velocity of said second moveable member.

The invention will be more clearly understood by reference to the following detailed description of exemplary embodiments thereof in conjunction with the accompanying drawings in which.

Figure 1:
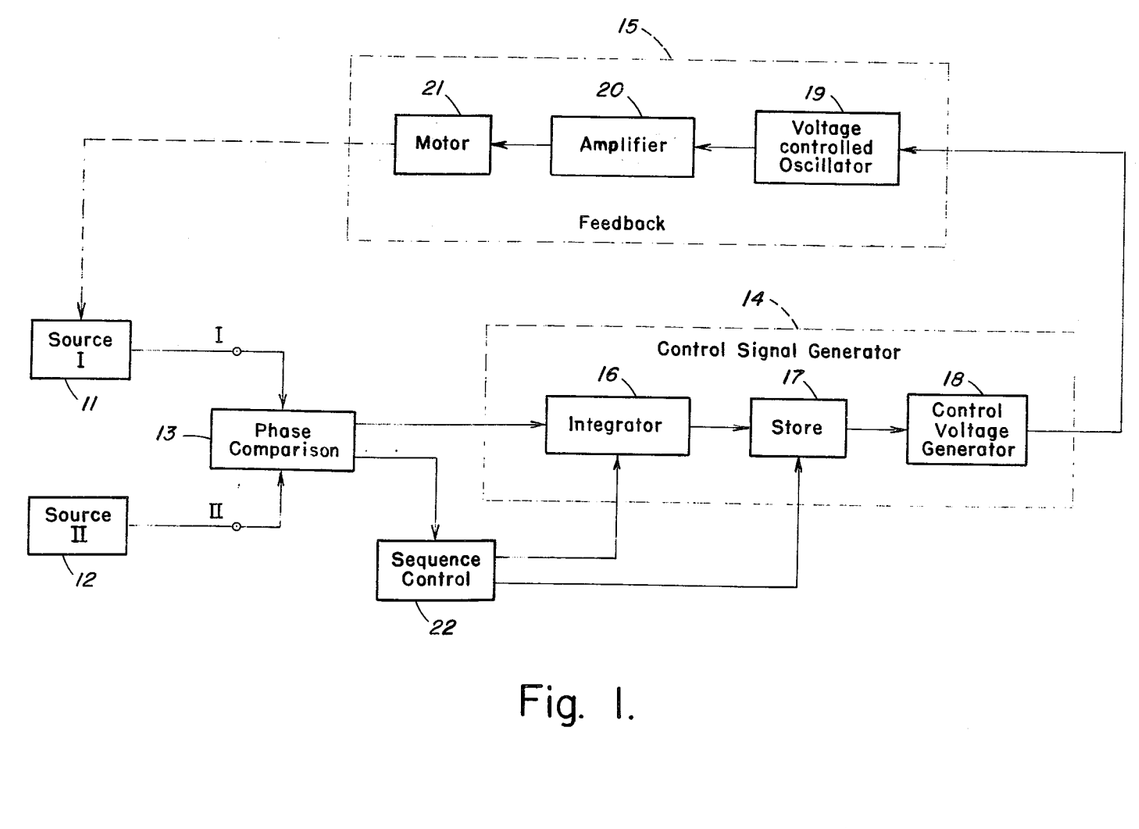
FIG. 1 is a block diagram of the synchronizing apparatus of the present invention.

Referring now to the drawings wherein like reference numerals are used throughout, and in particular to FIG. 1, there is illustrated a block diagram of an embodiment of the synchronizing apparatus of the present invention which comprises first signal producing means 11, second signal producing means 12, comparison means 13, control signal generating means 14 and feedback means 15. First signal producing means 11 may comprise a conventional signal generator for providing a signal having a phase characteristic to be controlled in accordance with the present invention. The signal produced by first signal producing means 11 may be an analog signal having an a.c. and/or d.c. component, or a pulse signal. As will be further described hereinbelow, the signal produced by first signal producing means 11 may be indicative of the speed of a first moveable member such as a rotating device having an angular velocity or a translating device having a rectilinear velocity. Typical examples of the former may comprise rotating drums or shafts, and typical examples of the latter may comprise a strip of recording medium or endless belt. Those skilled in the art will recognize that the speed of a moving member may be indicated by providing one or a plurality of indexing means on said moving member and sensing means for detecting the passage of said indexing means through a predetermined position. Thus, if said moving means comprises a rotating device, said indexing means may comprise an electrically conductive strip mounted on the periphery of said rotating device and said sensing means may comprise an electrical contact whereby an electrical circuit is completed each time said conductive strip rotates into the vicinity of said electrical contact. Similarly, said indexing means may comprise a light-reflecting strip or a sense marking adapted to modulate radiant energy and said sensing means may comprise a photocell responsive to the increase in the intensity of the light reflected by said light-reflecting strip or to the modulation of radiant energy by said sense marking. If said moving means comprises a translating device, the indexing means may be similar to those aforedescribed and spaced uniformly along the length of said moving means.

Second signal producing means 12 may be similar to first signal producing means 11; however, as will soon become apparent, the phase characteristic of the signal produced by said second signal producing means 12 need not be controlled and, for the purpose of the present description, may act as a reference for controlling the signal produced by said first signal producing means 11. Hence, second signal producing means 12 may comprise a reference signal generator, well known to those skilled in the art. Comparison means 13 is coupled to the first and second signal producing means 11 and 12, respectively, and is adapted to determine the phase relationship between the signals respectively supplied thereto, and to generate signals indicative of said phase relationship. Accordingly, comparison means 13 may comprise a conventional phase detecting circuit wherein the signal produced by second signal producing means 12 is utilized as a reference signal. Comparison means 13 may comprise pulse duration modulation means for generating a pulse signal having a time duration proportional to the difference between the phases of the signals supplied thereto. The forthcoming description of FIG. 2 will specify one embodiment of such pulse duration modulation means.

Control signal generating means 14 is coupled to comparison means 13 and serves to provide a control signal having a magnitude determined by the signals generated by said comparison means 13. As illustrated in FIG. 1, control signal generating means 14 may comprise integrating means 16 coupled to storage means 17 which, in turn, is coupled to a control voltage generator 18. Integrating means 16 may comprise a conventional operational amplifier integrating circuit of the type well known in the prior art. Alternatively, integrating means 16 may comprise a low-pass R-C circuit or, if desired, a digital integrating circuit. In addition, integrating means 16 preferably includes means to reset the output signal thereof to an initial condition. Storage means 17 is adapted to store the maximum amplitude obtained by the integrated signal provided by integrating means 16 and may comprise an analog storage device such as a grounded capacitor or other conventional analog storage means, or a digital storage device such as a storage register or magnetic storage device. A specific embodiment of storage means 17 will subsequently be described and the manner in which the maximum amplitude obtained by the integrated signal is stored will be explained in detail. However, it should be understood that, for the purpose of describing the block diagram of FIG. 1, storage means 17 may comprise a conventional sample and hold network.

The control voltage generator 18 coupled to storage means 17 is adapted to provide the control signal referred to hereinabove and may comprise amplifying means to amplify the signal supplied thereto by storage means 17 to a desired value. In the absence of a stored signal, control voltage generator 18 provides at its output terminal, a d.c. voltage of constant amplitude for a purpose soon to become apparent. It is recognized that if the amplitude of the signal stored by storage means 17 is of a sufficient magnitude, the control voltage generator 18 may be omitted.

Integrating means 16 and storage means 17 are additionally coupled to sequence control means 22 and are supplied with operating control signals therefrom. The operating control signal supplied to integrating means 16 from sequence control means 22 is adapted to reset the integrating means 16 to its initial condition. Further, the operating control signal supplied to storage means 17 serves to enable the storage means 17 to store the maximum amplitude obtained by the integrated signal. Hence, if storage means 17 comprises a sample and hold network, the operating control signal supplied thereto may be analogous to a sampling signal. Accordingly, sequence control means 22 may comprise a digital logic circuit that automatically generates the aforementioned operating control signals when comparison means 13 has determined the phase relationship between the signals produced by first and second signal producing means 11 and 12, respectively. A more detailed discussion of sequence control means 22 is set forth below in conjunction with the description of FIG. 2.

The output of control signal generating means 14 is coupled to feedback means 15, the latter being adapted to modify the operation of the first signal producing means 11 in accordance with the control signal provided by control signal generating means 14. Feedback means 15 comprises variable frequency generating means 19 having an output coupled to modifying means 21 via amplifier 20. The variable frequency generating means 19 is supplied with the control signal generated by control signal generating means 14 and is capable of producing a periodic signal having a frequency determined by the magnitude of said control signal. Hence, variable frequency generating means 19 may comprise conventional frequency modulating means such as a voltage controlled oscillating means. Modifying means 21 is coupled to the first signal producing means 11 and serves to alter the operating characteristics of first signal producing means 11 whereby the phase of the signal provided by first signal producing means 11 is altered in accordance with the periodic signal produced by variable frequency generating means 19. Accordingly, if the first signal producing means 11 comprises a moveable member as described hereinabove, modifying means 21 may comprise an electric motor mechanically coupled to the moveable member and operative to impart a velocity thereto. It is evident that the speed of the moveable member is proportional to the angular velocity of the electric motor, and the angular velocity of the electric motor is dependent upon the frequency of the signal applied thereto. The electric motor may comprise a synchronous motor. It is, of course, understood that modifying means 21 may comprise an electric motor whose angular velocity is dependent upon the magnitude of the signal applied thereto. In that case, the variable frequency generating means 19 may be omitted and the output of control signal generating means 14 coupled directly to amplifier 20; or, alternatively, control signal generating means 14 may be coupled to a conventional amplitude modulating means.

The operation of the apparatus illustrated in FIG. 1 will now be described. It will be initially assumed that first and second signal producing means, 11 and 12, comprise first and second moveable members having velocities imparted thereto by first and second driving means, respectively. It will be further assumed that the velocities of the first and second moveable members are not necessarily equal. As was described hereinabove, the velocity of the first moveable member may be indicated by signals which are produced by first sensing means fixedly located in a first predetermined position when the indexing means includable in the first moveable member traverse said first predetermined position. Hence, the frequency of the signals produced by first signal producing means 11 is directly related to te velocity of the first moveable member. Similarly, the velocity of the second moveable member may be indicated by signals which are produced by second sensing means fixedly located in a second predetermined position when indexing means includable in the second moveable member traverse said second predetermined position. The frequency of the signals produced by second signal producing means 12 is directly related to the velocity of the second moveable member. The ratio of the spacing between the consecutive indexing means of the first moveable member to the spacing between the consecutive indexing means of the second moveable member should be equal to the ratio of the velocity of the first moveable member to the velocity of the second moveable member. Accordingly, the frequencies of the signals applied to comparison means 13 will be equal, notwithstanding the different velocities represented thereby, when the velocity of the first moveable member is synchronized with the velocity of the second moveable member.

If the signals applied to comparison means 13 are pulses, comparison means 13 produces a pulse having a time duration equal to the phase difference between the leading edges of the applied pulses. If the signals applied to comparison means 13 are a.c. signals, comparison means 13 may additionally include zero crossing detecting means to generate impulses at the zero crossing times of the applied signals. A pulse having a time duration equal to the phase difference between the generated impulses may then be produced. The pulse produced by comparison means 13 may admit of a first polarity when the signal supplied by the first signal producing means 11 exhibits a phase leading relationship with respect to the signal supplied by the second signal producing means 12; and, conversely, the pulse produced by comparison means 13 may admit of a second polarity when the signal supplied by the first signal producing means 11 exhibits a phase lagging relationship with respect to the signal supplied by the second signal producing means 12. It is, therefore, understood, that when the alignment of a first moving member admits of a desired relationship with respect to the alignment of a second moving member, the signals applied to comparison means 13 are in phase and comparison means 13 does not produce a pulse. If the signals applied to phase comparison means 13 maintain a phase coincidence relationship throughout a substantial interval of time, it can be deduced that the velocity of the first moving member is in synchronism with the velocity of the second moving member. An exemplary embodiment of comparison means 13 is described below with respect to FIG. 2, and one skilled in the art will readily perceive several equivalents thereof.

The pulse produced by comparison means 13 is applied to integrating means 16 of control signal generating means 14. As is understood, the integral of a pulse signal will approximate a linearly increasing signal such as a ramp signal or sawtooth waveform, having a slope proportional to the amplitude of the pulse signal. The maximum amplitude obtained by the integrated signal during each integrating cycle is established by the duration of the pulse signal. Hence, if the pulse produced by comparison means 13 is of positive polarity, the slope of the integrated signal is positive and, conversely, if the pulse produced by comparison means 13 is of negative polarity, the slope of the integrated signal is negative. When the integrated signal obtains its maximum amplitude, sequence control means 22, in a manner to be described, enables storage means 17 to store said maximum amplitude. If storage means 17 comprises an analog storage device, such as a grounded capacitor, it should be apparent that the amplitude of the signal stored thereby represents an error signal indicative of the phase relationship between the signals produced by the first and second signal producing means 11 and 12, respectively, and the polarity of the stored signal represents a leading or lagging phase relationship. At a predetermined period of time subsequent to the storing of the integrated signal, sequence control means 22, in a manner described below, applies a reset signal to integrating means 16 to reset the integrating means to an initial condition whereby a succeeding integrating cycle may be effected.

The error signal stored by storage means 17 is amplified by control voltage generator 18, which may comprise amplifying means, and applied to the variable frequency generating means 19 of feedback means 15. It is preferred, in some applications of the present invention, to provide a medial frequency about which the frequency of the periodic signal produced by variable frequency generating means 19 will vary in accordance with the error signal stored by storage means 17. Therefore, control voltage generator 18 may include combining means such as a summing amplifier to combine the error signal with a nominal or threshold voltage which corresponds to said medial frequency. Accordingly, the control signal applied to variable frequency generating means 19 will vary about a threshold level in accordance with the error signal stored by storage means 17. When the integrated signal applied to and stored by storage means 17 is zero, i.e., when the signals applied to comparison means 13 are in phase, control voltage generator 18 will supply the variable frequency generating means 19 with the nominal or threshold voltage. The periodic signal produced by variable frequency generating means 19 is amplified by amplifier 20 and applied to modifying means 21 as a supply signal therefor. If modifying means 21 comprises an electric motor, the angular velocity thereof is dependent upon the frequency of the supply signal.

It should now be readily apparent that when the alignment of a first moveable member admits of a desired relationship with respect to the alignment of a second moveable member, the signals produced by the first and second signal producing means 11 and 12, respectively, are in phase. If said desired relationship is maintained over an interval of time, the velocity of said first moveable member is in synchronism with the velocity of said second moveable member. Comparison means 13 does not produce a pulse and the output of the integrating means 16 is zero. Accordingly, the error signal stored by storage means 17 is zero and control voltage generator 18 applies a nominal or threshold voltage to the variable frequency generating means 19. Consequently, the frequency of the signal supplied to the electric motor by the variable frequency generating means 19 is unchanged and the motor continues to drive the first moveable member at the synchronized speed. If, however, the speed of the first moveable member is decreased because of external influence, or if the speed of the second moveable member is increased, the signals produced by the first signal producing means 11 will be applied to comparison means 13 in a phase lagging relationship with respect to the signals produced by the second signal producing means 12. Accordingly, comparison means 13 produces a pulse of a first polarity which, solely for the purpose of explanation, may be assumed to be positive, having a duration equal to the difference in the phases of the signals applied thereto. Integrating means 16 integrates the pulse produced by comparison means 13 to derive an analog signal representative of the phase relationship of the signals produced by the first and second signal producing means 11 and 12, respectively. The maximum amplitude obtained by the analog signal during the integrating cycle comprises an error signal that is applied to and stored by storage means 17. The error signal, which is here assumed to be of positive polarity, is added to te nominal or threshold voltage, by control voltage generator 18 to produce a control signal that is supplied to variable frequency generating means 19. The frequency of the periodic signal produced by variable frequency generating means 19 exceeds the medial frequency by an amount determined by the error signal, thereby driving the electric motor at an increased angular velocity. Consequently, the speed of the first moveable member is increased to advance the phase of the signal produced by first signal producing means 11, whereby the error signal is reduced to a null value and proper alignment of the first moveable member is obtained. If, now, the speed of the first moveable member is increased because of external influences, or if the speed of the second moveable member is decreased, thereby altering the relative alignment of said first moveable member the signals produced by the first signal producing means 11 will be applied to comparison means 13 in a phase leading relationship with respect to the signals produced by the second signal producing means 12. Accordingly, comparison means 13 produces a pulse of a second polarity, which, solely for the purpose of explanation, may be assumed to be negative, having a duration equal to the difference in the phases of the signals applied thereto. Integrating means 16 integrates the pulse produced by comparison means 13 to derive an analog signal representative of the phase relationship of the signals produced by the first and second signal producing means 11 and 12, respectively. The maximum amplitude obtained by the analog signal during the integrating cycle comprises an error signal that is applied to and stored by storage means 17. The error signal, which is here assumed to be of negative polarity, is subtracted from the nominal or threshold voltage by control voltage generator 18 to produce a control signal that is supplied to variable frequency generating means 19. The frequency of the periodic signal produced by variable frequency generating means 19 is less than the medial frequency by an amount determined by the error signal, thereby driving the electric motor at a decreased angular velocity. Consequently, the speed of the first moveable member is decreased to retard the phase of the signal produced by first signal producing means 11, whereby the error signal is reduced to a null value and proper alignment of the first moveable member is obtained.

It should be understood that the present invention is not limited to the embodiment employing first and second moveable members and an electric motor. For example, the second signal producing means 12 may comprise a reference signal oscillator for producing reference signals with which to synchronize the speed of the first moveable member. In addition, first signal producing means 11 may include a device other than a moveable member, such as a variable frequency generator or variable delay generator, thereby obviating the need for an electric motor.

Figure 2:
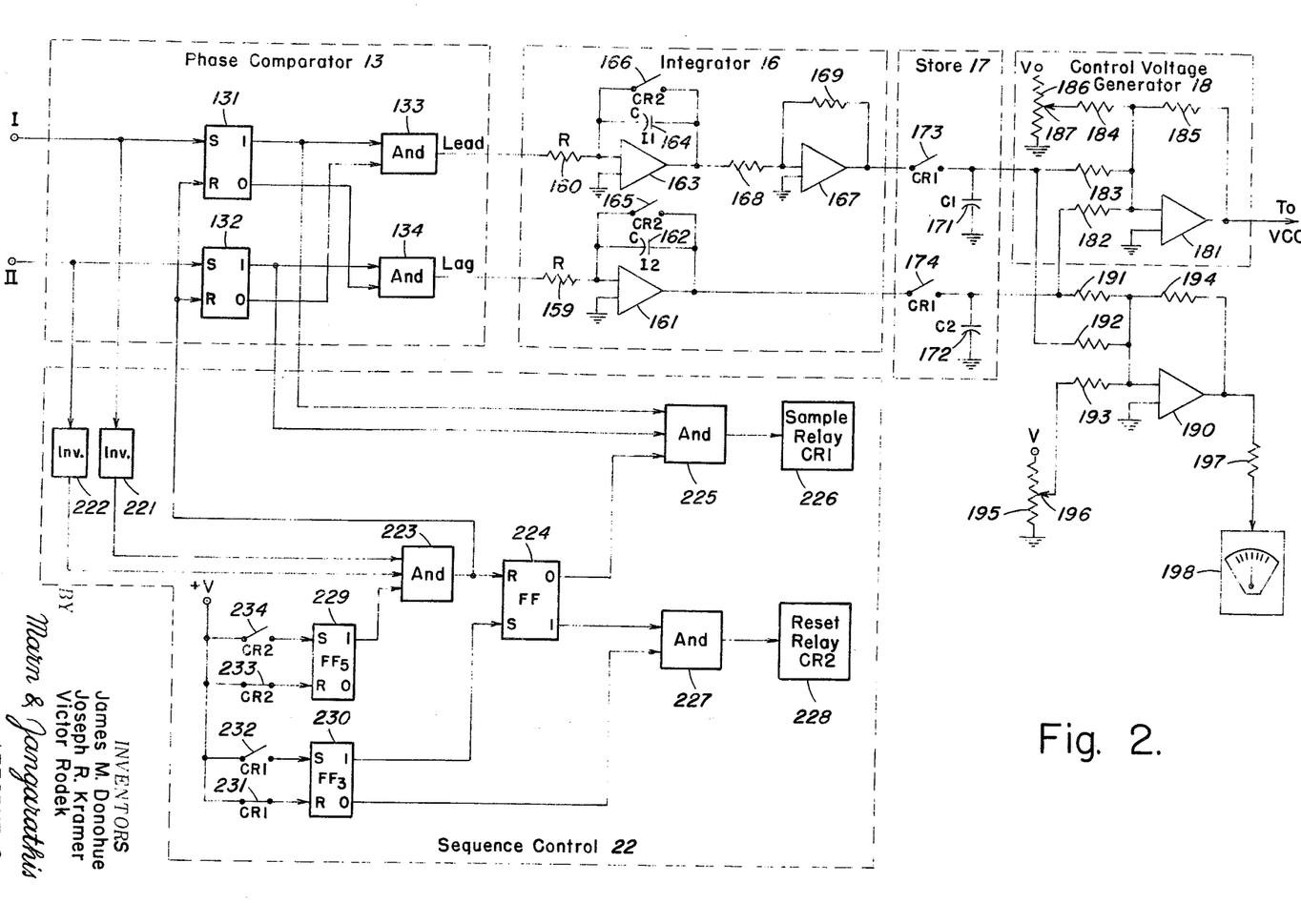
FIG. 2 is a schematic diagram of a portion of the apparatus of FIG. 1.

FIG. 2 is a schematic diagram of a portion of the apparatus that may be utilized in the embodiment of FIG. 1 and comprises comparison means 13, integrating means 16, storage means 17, control voltage generator 18 and sequence control means 22. Comparison means 13 comprises first and second bistable multivibrators 131 and 132, respectively, and first and second coincidence means 133 and 134, respectively. Each bistable multivibrator is provided with first and second input terminals and first and second output terminals and is capable of assuming a first or second output state in accordance with the signals applied to the input terminals thereof. The first input terminal of bistable multivibrator 131 is adapted to be provided with a pulse signal such as a pulse signal derived from first signal producing means 11 of FIG. 1. Similarly, the first input terminal of bistable multivibrator 132 is adapted to be provided with a pulse signal such as a pulse signal derived from second signal producing means 12. Coincidence means 133 may comprise a conventional AND gate and includes a first input terminal coupled to a first output terminal of bistable multivibrator 131 and a second input terminal coupled to a second output terminal of bistable multivibrator 132. Coincidence means 134 is similar to the coincidence means 133 and includes a first input terminal coupled to a first output terminal of bistable multivibrator 132 and a second input terminal coupled to a second output terminal of bistable multivibrator 131.

Bistable multivibrators 131 and 132 initially assume their second output states, respectively. Accordingly, each of coincidence means 133 and 134 is provided with a signal at the second input terminal thereof. If a pulse signal is applied to the first input terminal of bistable multivibrator 131 prior to the application of a pulse signal to the first input terminal of bistable multivibrator 132, bistable multivibrator 131 will assume its first output state, thereby providing coincidence means 133 with a signal at the first input terminal thereof and removing the signal previously provided at the second input terminal of coincidence means 134. Hence, coincidence means 133 will initiate an output pulse signal when the pulse applied to bistable multivibrator 131 exhibits a leading phase relationship with respect to the pulse applied to bistable multivibrator 132. When bistable multivibrator 132 is subsequently provided with a pulse at the first input terminal thereof, bistable multivibrator 132 will assume its first output state, thereby removing the signal previously provided at the second input terminal of coincidence means 133, causing the output pulse signal initiated by coincidence means 133 to terminate. It should now be readily apparent that if the pulse applied to bistable multivibrator 131 exhibits a lagging phase relationship with respect to the pulse applied to bistable multivibrator 132, the comparison means 13 operates in a manner complementary to that just described whereby coincidence means 134 produces an output pulse signal having a time duration equal to the time delay between the pulses applied to bistable multivibrators 132 and 131, respectively.

Integrating means 16 includes first and second integrating circuits. The first integrating circuit comprises an input resistance means 160, amplifier means 163, capacitance means 164 and switch means 166. Resistance means 160 couples coincidence means 133 to amplifier means 163, and exhibits a resistance of R ohms. Amplifier means 163 is preferably a high gain, solid state amplifier having a very high input impedance, and may comprise a conventional operational amplifier. Feedback capacitance means 164 couples the output of amplifier means 163 to the input thereof and exhibits a capacitance of C microfarads. A switch means 166 is connected in parallel relationship with capacitance means 164. As is understood by those skilled in the art, the closing of switch means 166 is effective to discharge capacitance means 164 thereby resetting the first integrating means to an initial state. Hence, an integrating cycle may be terminated by the closure of switch means 166. Switch means 166 may comprise a solid-state switch, such as a switching transistor, or may comprise one of a plurality of armatures of reset relay means 228, further described below. It is clear that if a pulse signal is applied to resistance means 160, the pulse signal will be integrated by the first integrating circuit, resulting in a ramp signal having a constant slope equal to the product of the amplitude of the pulse signal and the inverse of the time constant (RC) of the integrating circuit. At the termination of the pulse signal applied to the resistance means 160, the amplitude obtained by the ramp signal is equal to the product of the slope thereof and the time duration of the applied pulse signal. Hence, the signal at the output of amplifier means 163 is an analog signal representative of the duration of an input pulse signal applied thereto.

The second integrating circuit of integrating means 16 is similar to the just described first integrating circuit and comprises an input resistance means 159, amplifier means 161, capacitance means 162 and switch means 165. Resistance means 159, having a resistance R, couples coincidence means 134 to amplifier means 161, the latter being similar to amplifier means 163. Feedback capacitance means 162 couples the output of amplifier means 161 to the input thereof and exhibits a capacitance of C microfarads. Switch means 165, which is similar to switch means 166, is connected in parallel relationship with capacitance means 162 and is adapted to discharge capacitance means 162 thereby resetting the second integrating means to an initial state. The second integrating means serves to integrate a pulse signal applied to resistance means 159, resulting in a ramp signal having a constant slope equal to the product of the amplitude of the pulse signal and the inverse of the time constant (RC) of the integrating circuit. Upon the termination of the pulse signal applied to resistance means 159, the amplitude obtained by the ramp signal is equal to the product of the slope thereof and the time duration of the applied pulse signal. It should be realized that each of amplifier means 161 and 163 may be so chosen, or the bias thereof so adjusted, that the ramp signal produced by the amplifier means obtains a saturation voltage prior to the termination of the pulse signal applied to the amplifier means. As will soon become apparent, this limits the maximum amplitude of the error signal stored by storage means 17.

For a purpose soon to be understood, it is desired to convert the polarity of the analog signal produced by amplifier means 163. Accordingly, polarity inverting means comprised of amplifier means 167 and resistance means 168 and 169 is provided, wherein resistance means 168 couples amplifier means 163 to amplifier means 167 and resistance means 169 is a feedback resistor interconnecting the output of amplifier means 167 to the input thereof. Amplifier means 167 is similar to aforedescribed amplifier means 163 and may be an operational amplifier. It is understood that a polarity inverting means having alternative configurations may be utilized.

Storage means 17 comprises a first grounded capacitance means 171 selectively coupled to amplifier means 167 by switch means 173 and a second grounded capacitance means 172 selectively coupled to amplifier means 161 by switch means 174. Switch means 173 is similar to switch means 174 and may comprise a solid-state switch, such as a switching transistor, or may be one of a plurality of armatures of sample relay means 226, further described below. Switch means 173 is adapted to be closed for a sufficient period of time to enable grounded capacitance means 171 to charge to the level of the inverted analog signal appearing at the output of amplifier means 167; and switch means 174 is adapted to be closed for a sufficient period of time to enable grounded capacitance means 172 to charge to the level of the analog signal appearing at the output of amplifier means 161. It is clear that each combination of switch means and grounded capacitance means comprises a conventional "sample and hold" circuit.

Control voltage generator 18 comprises amplifier means 181, resistance means 182–185 and adjustable resistance means 186. Amplifier means 181 is similar to aforedescribed amplifier means 163 and may comprise an operational amplifier. Resistance means 182 couples grounded capacitance means 172 to amplifier means 181, resistance means 183 couples grounded capacitance means 171 to amplifier means 181 and resistance means 184 couples adjustable resistance means 186 to amplifier means 181. In addition, resistance means 185 is a feedback resistor interconnecting the output of amplifier means 181 to the input thereof. Adjustable resistance means 186 is adapted to be provided with a constant supply voltage V and may comprise a potentiometer having an adjustable contact 187. Hence, the magnitude of the voltage applied to resistance means 184 is dependent upon the position of adjustable contact 187. In the illustrated configuration, amplifier means 181 serves to algebraically combine the signals applied to each of resistance means 182, 183 and 184.

The sequence control means 22 comprises coincidence means 223, 225 and 227, bistable multivibrators 224, 229 and 230, sample relay means 226 and reset relay means 228. Coincidence means 223 may comprise a conventional AND gate and is adapted to produce a signal at an output terminal thereof when the input terminals thereof are provided with coinciding input signals. First and second input terminals of coincidence means 223 are coupled to level inverting means 221 and 222, respectively. A third input terminal of coincidence means 223 is coupled to the first output terminal of bistable multivibrator 229. The latter is similar to aforedescribed bistable multivibrator 131, and includes first and second input terminals selectively provided with an activating signal from source +V by complementary switch means 233 and 234. Switch means 233 normally assumes a closed state and may comprise a solid-state switch, such as a switching transistor, or may comprise one of a plurality of armatures of reset relay means 228. Switch means 234 normally assumes an open state and may comprise a solid-state switch, such as a switching transistor, or may comprise one of a plurality of armatures of reset relay means 228.

The output terminal of coincidence means 223 is coupled to the second input terminal of each of bistable multivibrators 131 and 132 and is adapted to reset said bistable multivibrators to their respective second output states. The output terminal of coincidence means 223 is additionally coupled to the second input terminal of bistable multivibrator 224 whose second output terminal is coupled to an input terminal of coincidence means 225. The first input terminal of bistable multivibrator 224 is coupled to the first output terminal of bistable multivibrator 230; and the first output terminal of bistable multivibrator 224 is coupled to an input terminal of coincidence means 227. Accordingly, bistable multivibrator 224 is effective to assume a first output state when bistable multivibrator 230 assumes a first output state and to assume a second output state when bistable multivibrators 131 and 132 are reset to their respective second output states.

Coincidence means 225 is similar to aforedescribed coincidence means 223 and includes additional input terminals respectively coupled to the first output terminals of bistable multivibrators 131 and 132. The output terminal of coincidence means 225 is coupled to the energizing coil of sample relay means 226 and is adapted to activate said relay means when the analog signal produced by integrating means 16 has obtained its maximum amplitude during an integrating cycle. It is understood that the output terminal of coincidence means 225 may alternatively be coupled to the activating input terminal of a solid-state switch means.

Coincidence means 227 is similar to coincidence means 223, described hereinabove, and includes an additional input terminal coupled to the second output terminal of bistable multivibrator 230. Bistable multivibrator 230 is similar to bistable multivibrator 229 and includes first and second input terminals selectively provided with an activating signal from source +V by complementary switch means 231 and 232. Switch means 231 normally assumes a closed state and may comprise a solid-state switch, such as a switching transistor, or may comprise one of a plurality of armatures of sample relay means 226. Switch means 232 normally assumes an open state and may comprise a solid-state switch, such as a switching transistor, or may comprise one of a plurality of armatures of sample relay means 226. The output terminal of coincidence means 227 is coupled to the energizing coil of reset relay means 228 and is adapted to activate said relay means subsequent to the storing by storage means 17 of the analog signal produced by integrating means 16. The output terminal of coincidence means 227 may be coupled, in the alternative, to the activating input terminal of a solid-state switch means, as is readily appreciated.

Figure 3:
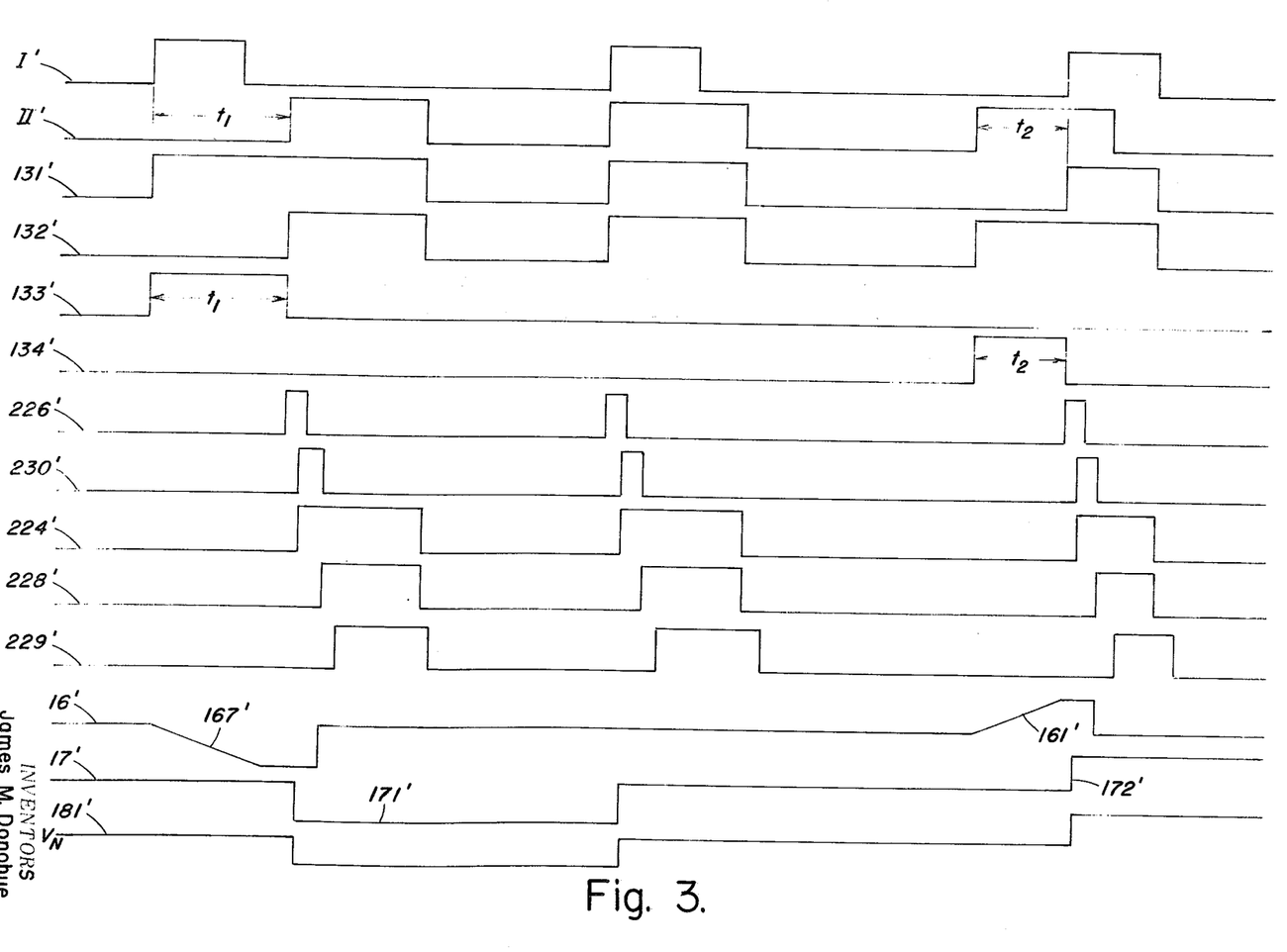
FIG. 3 is a graphical representation of the waveforms generated by the apparatus of FIG. 2.

The operation of the apparatus of FIG. 2 will now be described in conjunction with the explanatory waveform diagram of FIG. 3 wherein primed reference numerals identify the waveforms produced by corresponding elements identified by unprimed reference numerals. Initially, each bistable multivibrator assumes its second output state, the first and second integrating circuits of integrating means 16 are reset to their initial states, respectively, and switch means 172 and 173 are open. It will first be assumed that a pulse signal I′ is applied to the first input terminal of bistable multivibrator 131 prior to the application of a pulse signal II′ to the first input terminal of bistable multivibrator 132. It is recalled that this occurrence indicates that the relative alignment of a first moveable member is displaced in a leading relationship with respect to a second moveable member. Stated otherwise, the signal produced by the first signal producing means 11 of FIG. 1 is in a phase leading relationship with respect to the signal produced by the second signal producing means 12 of FIG. 1. Bistable multivibrator 131 responds to pulse signal I′ to assume its first output state as indicated at 131′. Accordingly, coincidence means 133 responds to the first output state of bistable multivibrator 131 and the second output state of bistable multivibrator 132 to produce a pulse 133′. The pulse 133′ is applied to resistance means 160 and the first integrating circuit of integrating means 16 proceeds to integrate the pulse 133′. The polarity of the integrated signal is inverted by amplifier means 167, or an equivalent polarity inverting means, to produce the ramp signal 167′ having negative slope. As indicated in FIG. 3, the ramp signal produced by the first integrating circuit obtains a saturation voltage prior to the termination of pulse 133'. It is observed that when coincidence means 133 is provided with two input signals, coincidence means 134 is inhibited from producing an output signal. Consequently, resistance means 159 of the second integrating circuit is not provided with a signal and the output of amplifier means 161 maintains the initial state thereof.

When the pulse II' is applied to the first input terminal of bistable multivibrator 132 at a time $t_1$ seconds subsequent to the occurrence of pulse I', bistable multivibrator 132 assumes its first output state, as manifested by the signal 132'. Accordingly, the signal previously applied to the second input terminal of coincidence means 133 is removed therefrom and pulse 133' produced by coincidence means 133 terminates.

When bistable multivibrator 132 assumes its first output state, coincidence means 225 is provided with an input signal at each input terminal thereof, thereby generating an output signal to energize sample relay means 226 as indicated at 226'. The energization of sample relay means 226 closes all open armatures thereof and opens all closed armatures. Hence, switch means 232 provides an activating signal from source +V to the first input terminal of bistable multivibrator 230 and switch means 231 removes the activating signal supplied to the second input terminal of said bistable multivibrator. Bistable multivibrator 230 then assumes its first output state, as illustrated by the pulse 230'. The slight time delay between the leading edges of pulse 226' and pulse 230' is attributed to the inherent delay of the energizing coil of sample relay means 226. In addition, switch means 173 and 174 apply the analog signals produced by amplifier means 167 and 161 to grounded capacitance means 171 and 172, respectively. Since an analog signal is produced only at the output of amplifier means 167, grounded capacitance means 171 is supplied with an analog signal 167' whose magnitude is proportional to the phase difference $t_1$ between pulses I' and II', and whose polarity represents a phase leading relationship. The analog signal stored by grounded capacitance means 172 is effectively zero. It should here be noted that, even if the ramp signal produced by the first integrating circuit does not obtain a saturation voltage, the maximum voltage obtainable by the ramp signal occurs at the termination of the pulse 133' and is equal to the product of the slope of the ramp signal and the duration $t_1$ of pulse 133'. Thus, the error signal 171' stored by grounded capacitance means 171 is equal to the maximum voltage obtained by the ramp signal during the integrating cycle, because switch means 173 is closed immediately following the termination of pulse 133'.

When bistable multivibrator 230 assumes its first output state, pulse 230' is applied to the first input terminal of bistable multivibrator 224, thereby setting the latter to its first output state as indicated at 224'. It is observed that when bistable multivibrator 224 assumes its first output state, the signal previously applied to an input terminal of coincidence means 225 by the second output terminal of bistable multivibrator 224 is removed therefrom. Hence, coincidence means 225 is deactivated and sample relay means 226 is de-energized as shown at 226'. The slight delay between the leading edge of pulse 224' and the trailing edge of pulse 226' is attributable to the inherent delay in the response of the energizing coil of sample relay means 226. Switch means 173, 174, 231 and 232 assume the positions illustrated in FIG. 2 as a result of the de-energization of sample relay means 226. Consequently, the output of amplifier means 167 is removed from grounded capacitance means 171. The error signal stored by grounded capacitance means 171 maintains a substantially constant value, because of the low inherent leakage characteristics of capacitance means 171. The leakage characteristics may be further improved by connecting a conventional voltage follower circuit to capacitance means 171. The error signals stored by grounded capacitance means 171 and 172 are algebraically combined by amplifier means 181 with a nominal or threshold voltage $V_N$, derived at adjustable contact 187, to produce the control signal 181'. It should be recognized by one skilled in the art that the rate of change of the magnitude of control signal 181' may be limited by providing a filter capacitor in parallel relationship with resistance means 185. In addition, the closing of switch means 231 and opening of switch means 232 resets bistable multivibrator 230 to its second output state. Coincidence means 227 is, therefore, provided with an input signal at each input terminal thereof, thereby generating an output signal to energize reset relay means 228 as indicated at 228'. The energizing of reset relay means 228 closes all open armatures thereof and opens all closed armatures. Hence, switch means 234 provides an activating signal from source +V to the first input terminal of bistable multivibrator 229 and switch means 233 removes the activating signal supplied to the second input terminal of said bistable multivibrator. Bistable multivibrator 229 then assumes its first output state, as illustrated by the pulse 229'. The slight time delay between the leading edges of pulse 228' and pulse 229' is attributed to the inherent delay of the energizing coil of reset relay means 228. In addition, switch means 165 and 166 discharge capacitance means 162 and 164 to reset the first and second integrating circuits of integrating means 16 to their initial conditions, as indicated at 16', thereby terminating the integrating cycle.

When bistable multivibrator 229 assumes its first output state, coincidence means 223 is provided with pulse 229' at an input terminal thereof. The remaining input terminals of coincidence means 223 are provided with input signals by level inverting means 221 and 222, respectively, when pulses I' and II' terminate. At that time, coincidence means 223 produces an output signal that resets bistable multivibrators 131, 132 and 224 to their respective second output states. Hence, coincidence means 225 and 227 are deactivated, and the energizing signal supplied by coincidence means 227 to reset relay means 228 is removed. Reset relay means 228 is de-energized, as shown by the termination of pulse 228', and switch means 165, 166, 233 and 234 assume the positions illustrated in FIG. 2. Consequently, bistable multivibrator 229 is reset to its second output state, and the apparatus of FIG. 2 is now operable to respond to subsequently applied signals.

Thus, it is seen that when a signal produced by first signal producing means 11 is in a phase leading relationship with respect to the signal produced by second signal producing means 12, coincidence means 133 produces pulse 133' having a time duration representative of the phase relationship. The time duration of pulse 133' is transformed to an analog signal by the first integrating circuit of integrating means 16, and the polarity of the analog signal is inverted by amplifier means 167 to produce the analog signal 167'.

Grounded capacitance means 171 stores the maximum value obtained by analog signal 167' during the integrating cycle, as an error signal 171'. The error signal 171' is algebraically combined with a nominal or threshold voltage $V_N$ by amplifier means 181 to produce a control signal 181' which is applied to feedback means 15. The feedback means 15 modifies the operating characteristics of first signal producing means 11 in a manner that tends to synchronize the signal produced by first signal producing means 11 with the signal produced by second signal producing means 12.

When the first signal producing means 11 is synchronized with the second signal producing means 12, the leading edges of pulses I' and II' coincide. Accordingly, bistable multivibrators 131 and 132 are simultaneously set to their respective first output states, as indicated at 131' and 132'. Consequently, coincidence means 133 and 134 remain in their quiescent states and neither resistance means 159 nor resistance means 160 are provided with signals. Hence, the analog signal produced by each integrating means 16 is zero. Coincidence means 225 responds to the first output state assumed by bistable multivibrator 131, the first output state assumed by bistable multivibrator 132 and the second output state maintained by bistable multivibrator 224 to energize sample relay means 226. Energization of sample relay means 226 closes switch means 173, 174 and 232, and opens switch means 231. Grounded capacitance means 171 and 172 store the analog signals produced by the first and second integrating circuits. In addition, bistable multivibrator 230 is set to its first output state, as illustrated at 230', which, in turn, sets bistable multivibrator 224 to its first output state, as indicated at 224'. Coincidence means 225 is thereby deactivated and sample relay means 226 is de-energized. Switch means 173, 174, 231 and 232 resume the positions illustrated in FIG. 2 and the error signals stored by grounded capacitance means 171 and 172, the amplitudes of which are equal to zero, are algebraically combined, by amplifier means 181, with the nominal or threshold voltage $V_N$ to produce the control signal 181' having a magnitude equal to $V_N$.

The closing of switch means 231 resets bistable multivibrator 230 to its second output state which coincides with the first output state assumed by bistable multivibrator 224. Coincidence means 227 is thus provided with a signal at each input terminal thereof to energize reset relay means 228. Energization of reset relay means 228 closes switch means 165, 166 and 234 and opens switch means 233. The closing of switch means 165 and 166 has no appreciable effect on the first and second integrating circuits of integrating means 16 inasmuch as the integrating circuits had not been disturbed from their initial states. However, the closing of switch means 234 sets bistable multivibrator 229 to its first output state. When pulses I' and II' terminate, coincidence means 223 receives a signal at each input terminal thereof to effectuate the resetting of bistable multivibrators 131, 132 and 224 to their respective second output states. Pulse 224' is removed from the input terminal of coincidence means 227 and reset relay means 228 is de-energized. Switch means 165, 166, 233 and 234 assume the positions shown in FIG. 2 and bistable multivibrator 229 is reset to its second output state. It is thus seen, that when the time of occurrence of pulse I' is in synchronism with the time of occurrence of pulse II', the control signal 181' maintains the nominal or threshold level $V_N$ and does not vary thereabout.

If, now, the signals produced by first signal producing means 11 exhibit a lagging phase relationship with respect to the signals produced by second signal producing means 12 as, for example, when the proportional speed of a second moveable member exceeds that of a first moveable member such that the relative alignment of said first moveable member is displaced in a lagging relationship with respect to said second moveable member, pulse II' will be applied to the first input terminal of bistable multivibrator 132 prior to the application of pulse I' to the first input terminal of bistable multivibrator 131. Accordingly bistable multivibrator 132 assumes its first output state as indicated at 132' and coincidence means 134 is provided with a signal at each input terminal thereof. Therefore, coincidence means 134 applies a pulse signal 134' to resistance means 159 of the second integrating circuit of integrating means 16. The second integrating circuit integrates pulse 134' to produce the analog signal 161' at the output of amplifier means 161. It is assumed, merely for the purpose of explanation, that the analog signal 161' does not obtain a saturation voltage prior to the termination of pulse 134'.

When the pulse I' is applied to the first input terminal of bistable multivibrator 131 at a time $t_2$ seconds subsequent to the occurrence of pulse II', bistable multivibrator 131 assumes its first output state to produce pulse 131'. Accordingly, the signal previously supplied by the second output terminal of bistable multivibrator 131 to an input terminal of coincidence means 134 is removed therefrom, causing pulse 134' to terminate. It is understood that when pulse 134' terminates, the slope of the integral thereof is reduced to zero and the amplitude of the analog signal 161' maintains a constant value until the second integrating circuit is reset to its initial condition. The assumption of their respective first output states by bistable multivibrators 131 and 132, and the assumption of the second output state by bistable multivibrator 224 activates coincidence means 225 to energize sample relay means 226, as indicated at 226'. The energization of sample relay means 226 closes all open armatures thereof and opens all closed armatures. Hence, as previously described with reference to the occurrence of pulse I' in phase leading relationship with respect to the occurrence of pulse II', switch means 232 provides an activating signal to the first input terminal of bistable multivibrator 230 from source +V to set bistable multivibrator 230 to its first output state as indicated at 230'. In addition, switch means 173 and 174 apply the analog signals produced by amplifier means 167 and 161 to grounded capacitance means 171 and 172, respectively. The analog signal produced by amplifier means 167 is effectively zero and, therefore, only grounded capacitance means 172 is supplied with an analog signal 161' whose magnitude is proportional to the phase difference $t_2$ between pulses I' and II', and whose polarity represents a lagging phase relationship. Thus, grounded capacitance means 172 stores an error signal 172' equal to the maximum voltage obtained by analog signal 161'.

The assumption of its first output state by bistable multivibrator 230 provides pulse 230' to the first input terminal of bistable multivibrator 224, thereby setting the latter to its first output state, as indicated at 224', and removing the signal applied by the second output terminal of bistable multivibrator 224 to an input terminal of coincidence means 225. Hence, coincidence means 225 is deactivated, thereby de-energizing sample relay means 226, as illustrated by the termination of pulse 226'. Consequently, the electrical path between amplifier means 161 and grounded capacitance means 172 is interrupted. The error signal 172' stored by grounded capacitance means 172 is algebraically combined by amplifier means 181 with the nominal or threshold voltage $V_N$, derived at adjustable contact 187, to produce the control signal 181'. In addition, the de-energization of sample relay means 226 closes switch means 231 to reset bistable multivibrator 230 to its second output state. Coincidence means 227 is, therefore, provided with an input signal at each input terminal thereof, and generates an output signal to energize reset relay means 228 as indicated at 228'. The energization of reset relay means 228 closes switch means 234 to provide an activating signal from source $+V$ to the first input terminal of bistable multivibrator 229, thereby setting bistable multivibrator 229 to its first output state, as illustrated by the pulse 229'. In addition, switch means 165 and 166 discharge capacitance means 162 and 164, respectively, to terminate the integrating cycle and reset the first and second integrating circuits of integrating means 16 to their respective initial conditions.

When pulses I' and II' terminate, coincidence means 223 is provided with an input signal from level inverting means 221, an input signal from level inverting means 222 and pulse 229'. Accordingly, coincidence means 223 produces an output signal to reset bistable multivibrators 131, 132 and 224 to their respective second output states. Hence, pulse 224' is removed from an input terminal of coincidence means 227 and reset relay means 228 is deenergized. Consequently, switch means 233 is closed to reset bistable multivibrator 229 to its second output state, and the apparatus of FIG. 2 is operable to respond to signals subsequently applied thereto.

To summarize the operation of the apparatus schematically represented in FIG. 2, when the pulse I' adopts a phase leading relationship with respect to the pulse II', coincidence means 133 produces pulse 133' having a time duration representative of the phase relationship, and coincidence means 134 remains in its quiescent state. When, however, pulse I' adopts a phase lagging relationship with respect to pulse II', coincidence means 134 produces pulse 134' having a time duration representative of the phase relationship, and coincidence means 133 remains in its quiescent state. The time duration of pulse 133' is transformed to an analog signal 167' by the first integrating circuit of integrating means 16, and the time duration of pulse 134' is transformed to an analog signal 161' by the second integrating circuit of integrating means 16. Accordingly, error signals 171' and 172' are selectively stored by grounded capacitance means 171 and 172, respectively, in accordance with the leading or lagging phase relationship between pulses I' and II'. The stored error signal 171' or 172' is algebraically combined with a nominal or threshold voltage by amplifier means 181 to produce control signal 181'. It is observed, that when pulse I' is in a phase leading relationship with respect to pulse II', error signal 171' exhibits a first polarity whereby the control signal 181' is effective to produce a retardation in the phase of pulse I'. However, when pulse I' is in a phase lagging relationship with respect to pulse II', error signal 172' exhibits a second polarity whereby the control signal 181' is effective to produce a progression in the phase of pulse I'.

It is to be understood that variations of the exemplary embodiment illustrated in FIG. 2 are within the contemplation of the present invention. For example, integrating means 16 may be comprised of a single integrating circuit such as a differential integrator that integrates the difference between the signals produced by coincidence means 133 and 134. Or an algebraic subtracting circuit may couple the output terminals of coincidence means 133 and 134 to a single integrating circuit. It is recognized that a single integrating circuit obviates the necessity of a plurality of grounded capacitors included in storage means 17. Further, bistable multivibrators 131, 132, 229 and 230 may be replaced by monostable multivibrators exhibiting satisfactory duty cycle characteristics. If desired, the nominal or threshold voltage supplied to amplifier means 181 may be derived from a transducer coupled to the second moveable member whereby said transducer produces a signal directly proportional to the velocity of said second moveable member.

The apparatus of FIG. 2 admits of operating characteristics to accomodate momentary or intermittent alterations of the relative speed of moveable devices. Prolonged alterations of speed may be nullified by selectively positioning the adjustable contact 187 of adjustable resistance means 186. The selective positioning of adjustable contact 187 is facilitated by the monitoring circuit comprised of amplifier means 190, resistance means 191-195 and metering means 198. Amplifier means 190 is similar to aforedescribed amplifier means 181 and may comprise an operational amplifier. Resistance means 191 couples grounded capacitance means 172 to amplifier means 190, resistance means 192 couples grounded capacitance means 171 to amplifier means 190 and resistance means 193 couples adjustable resistance means 195 to amplifier means 190. In addition, resistance means 194 is a feedback resistor interconnecting the output of amplifier means 190 to the input thereof. Adjustable resistance means 195 is adapted to be provided with a constant supply voltage V and may comprise a potentiometer having an adjustable contact 196. The output of amplifier means 190 is coupled to metering means 198 by current limiting resistance means 197. The metering means 198 may comprise a conventional ammeter. It is recognized that the foregoing monitoring circuit is arranged in a configuration similar to that of control voltage generator 18 and, accordingly, a detailed explanation of the operation of the monitoring circuit is not deemed necessary.

The purpose of the monitoring circuit is to provide a visual indication of the operation of the synchronizing apparatus of the present invention. If metering means 198 is of the moving coil type, adjustable contact 196 is disposed such that the voltage supplied thereby to resistance means 193 is adequate to position the moving coil at a predetermined location on the scale of the metering means 198.

It is expected that, during the normal operation of the apparatus of the present invention, the control signal 181' applied to variable frequency generating means 19 will admit of the nominal or threshold level, and the frequency of the periodic signal generated by variable frequency generating means 19 will be sufficient to maintain synchronism between first and second moveable members. Accordingly, the moving coil of metering means 198 will remain at said predetermined location. If, now the synchronous relationship between the first and second moveable members is disturbed, the error signal 171' applied to resistance means 192 by grounded capacitance means 171 will displace the moving coil in a first direction. However, the control signal 181' will be sufficient to adjust the first moveable member in a manner whereby synchronism is restored, and the moving coil of metering means 198 will again be positioned at the predetermined location. Similarly, if an error signal 172' is applied to resistance means 191 by grounded capacitance means 172, the moving coil of metering means 198 will be displaced in a second direction. Consequently, it is anticipated that the moving coil will be subjected to occasional displacements during the operation of the apparatus of the present invention. If, however, the alignment of the first moveable member remains out of synchronism with respect to the alignment of the second moveable member for a prolonged period of time, the moving coil of metering means 198 will be subjected to prolonged or frequent displacements. This indicates that the frequency of the periodic signal generated by variable frequency generating means 19 is not sufficient to maintain the desired synchronism between the first and second moveable members. Accordingly, adjustable contact 187 must be positioned in a manner to correspondingly alter the nominal or threshold voltage applied thereby to resistance means 184, whereby the frequency of the periodic signal produced by variable frequency generating means 19 in response to control signal 181' is again sufficient to maintain synchronism.

Figure 4:
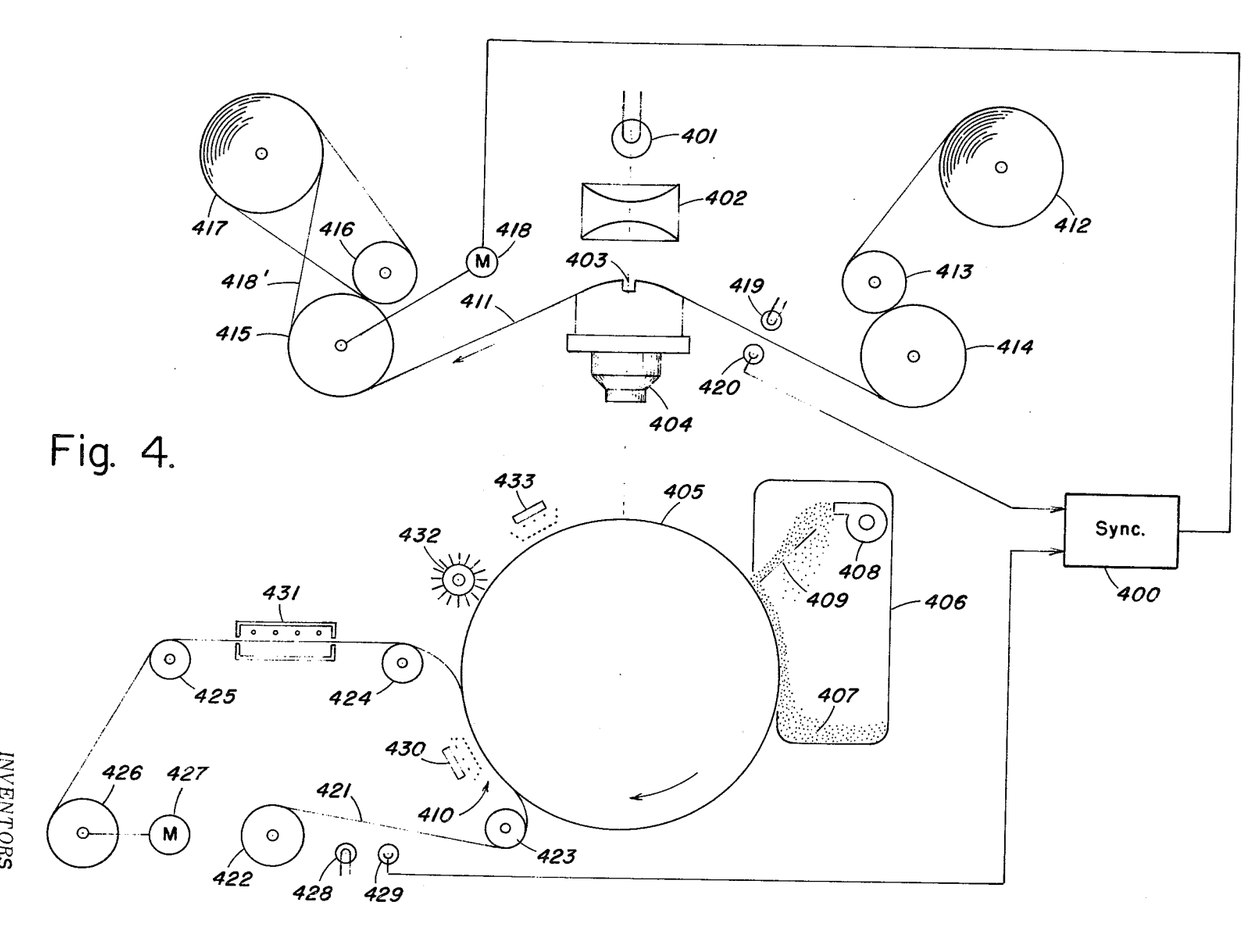
FIG. 4 is one exemplary embodiment of a system wherein the apparatus of the present invention may be utilized.

FIG. 4 illustrates a system for reproducing information wherein the apparatus of the present invention may be employed, and comprises synchronizing apparatus 400, as was described in detail in conjunction with FIG. 1, a filmstrip 411, optical projecting means 404, photoreceptor means 405, developing means 406, and web 421. The filmstrip 411 may comprise a web of microfilm bearing images of information prerecorded thereon, and uniformly spaced sense markings distributed along the length thereof. Filmstrip 411 is adapted to be transported from supply spool 412, over guide rolls 413 and 414, normal to slit 403, over capstan 415, guide roll 416, and on to take-up spool 417. The capstan 415 is mechanically coupled to electric motor 418, the latter being coupled to synchronizing apparatus 400. Capstan 415 is adapted to drive take-up spool 417 via spring loaded belt 418'. Lamp means 419 is fixedly disposed relative to the filmstrip 411 and is in optical communication with photocell means 420. Photocell means 420 is electrically coupled to synchronizing apparatus 400 and is adapted to provide signals in response to modulations of the radiant energy transmitted by lamp means 419.

Optical projecting means 404 comprises at least one magnifying lens adapted to project images at a predetermined magnification ratio. The images projected by optical projecting means 404 may be provided by illuminating the filmstrip 411 that is normal to slit 403. Accordingly, lamp 401 is capable of emitting light of the desired intensity and condenser lens 402 serves to conduct the light to an area of concentration disposed in the vicinity of slit 403.

Photoreceptor means 405 may take the form of an electrophotographic plate comprised of a photoconductive insulating body overlying a conductive backing. The photoconductive insulating body is adapted, in the well known manner, to have an electrostatic charge applied to its surface and to selectively dissipate such electrostatic charge upon the exposure thereof to illumination corresponding to a light and dark pattern, such as an information pattern, whereupon a latent image of such pattern is formed. The electrophotographic plate may comprise, for example, a layer of selenium in the configuration of a drum, as illustrated in FIG. 4. However, as will be apparent to those of ordinary skill in the art, the electrophotographic plate may take any convenient form such as an endless belt. The photoreceptor means 405 is adapted to be translated to a cleaning station 432, for a purpose subsequently described, and to charging unit 433. Cleaning station 432 may be of the type described in U.S. Pat. No. 2,751,616 issued to M. I. Turner, Jr., et al. The electrostatic charge applied to the surface of photoreceptor means 405 may be deposited thereon by charging unit 433 which may comprise a corona discharge device of the type described in U.S. Pat. No. 2,777,957 issued to L. E. Walkup.

Developing means 406 may comprise any well known form of electrophotographic developing apparatus which acts to develop an electrostatic latent image by the application of electroscopic material 407 capable of adhering to the electrostatic charge pattern on the photoreceptor means 405. The electroscopic material 407 may be applied to slide 409 from a dispenser 408, whereupon the electroscopic material 407 cascades down and over the electrostatic latent image on the surface of photoreceptor means 405.

Web 421 acts as a support surface to receive the developed image from photoreceptor means 405 at transfer station 410. Accordingly, the web 421 may be of any convenient type, such as paper, and is adapted to be transported from supply spool 422, over guide roll 423, through transfer station 410, over guide roll 424, through heat fusing means 431, guide roll 425 and on to take-up spool 426. The take-up spool 426 is mechanically coupled to electric motor 427. Guide rolls 423 and 424 serve to direct the web 421 into surface contact with photoreceptor means 405 in the vicinity of charging unit 430 at transfer station 410. Charging unit 430 may be similar to aforedescribed charging unit 433. In addition, the frictional forces between web 421 and photoreceptor means 405 may be such as to impart a rotational velocity to photoreceptor means 405. Alternatively, photoreceptor means 405 may be directly driven by a motor means, such as electric motor 427, mechanically coupled thereto. The heat fusing means 431 may be of a type disclosed in U.S. Pat. No. 2,852,651 which issued to Crumrine et al. The web 421 may include pre-established notations thereon, such as appropriate headings, columns and the like, wherein it is desired to print the information prerecorded on the filmstrip 411. In addition, the web 421 includes uniformly spaced sense markings distributed along the length thereof. Lamp means 428 is fixedly disposed relative to the web 421 and is in optical communication with photocell means 429. Photocell means 429 is electrically coupled to synchronizing apparatus 400 and is adapted to provide signals in response to modulations of the radiant energy transmitted by lamp means 419.

In the operation of the printing apparatus illustrated in FIG. 4, electric motor 418 drives capstan 415 at a speed determined by the synchronizing apparatus 400 in the now understood manner. It is recognized that, if desired, electric motor 418 may drive take-up spool 417. At the same time, electric motor 427 drives take-up spool 426 at a speed determined by the operating characteristics of the electric motor 427. The ratio between the speed of take-up spool 426 and the speed of capstan 415 should be equal to the magnification ratio of optical projecting means 404. As filmstrip 411 is transported, the radiant energy transmitted by lamp 419 is modulated by the sense markings distributed along the length of filmstrip 411. Photocell means 420 responds to the modulated radiant energy to apply signals to synchronizing apparatus 400. Hence, photocell means 420 may correspond to first signal producing means 11 of FIG. 1. It should be understood that the radiant energy transmitted by lamp means 419 may be transmitted directly to photocell means 420, as illustrated in FIG. 4, or may be reflected from the filmstrip 411 to photocell means 420.

In a similar manner, as web 421 is transported, the radiant energy transmitted by lamp 428 is modulated by the sense markings distributed along the length of web 421. Photocell means 429 responds to the modulated radiant energy to apply signals to synchronizing apparatus 400. Hence, photocell means 429 may correspond to second signal producing means 12 of FIG. 1. The radiant energy transmitted by lamp means 428 may be reflected from web 421 to photocell means 429, as illustrated in FIG. 4, or may be transmitted directly from lamp means 428 to photocell means 429. Hence, the signals applied to synchronizing apparatus 400 by photocell means 420 and 429 represent the alignments of filmstrip 411 and web 421, respectively, from which the respective transport speeds may be established. The synchronizing apparatus 400 operates in the manner previously described to synchronize the speed of filmstrip 411 with the speed of web 421 by varying the operating speed of electric motor 418. If desired, the speed of filmstrip 411 may be synchronized with the rotational velocity of photoreceptor means 405. It is, of course, understood that position detecting means other than the aforedescribed detecting means may be utilized to apply signals to synchronizing apparatus 400.

As photoreceptor means 405 rotates beneath charging unit 433, a uniform electrostatic charge is deposited on the surface thereof. The charged photoreceptor means 405 is rotated to a location subtending the output of optical projecting means 404. At this location, photoreceptor means 405 is exposed to a magnified image of the information recorded on filmstrip 411. Exposure of the photoreceptor means 405 selectively dissipates the charge thereon in accordance with the light and dark portions of the character pattern prerecorded on filmstrip 411 and transmitted by optical projecting means 404, resulting in an electrostatic latent image of a magnified character pattern.

When photoreceptor means 405 is rotated to the developing means 406, the electrostatic latent images are developed to form visible images by well known treatment with electroscopic material 407. The developed image is transferred to web 421 when photoreceptor means 405 is rotated to the transfer station 410. The electroscopic material may be transferred to web 421 by electrostatic transfer, adhesive transfer, or other conventional electrophotographic transfer techniques. After transfer of the image from photoreceptor means 405 to web 421, the photoreceptor means 405 is rotated to cleaning station 432, where any electroscopic material adhering to photoreceptor means 405 is removed and photoreceptor means 405 is prepared for re-use in a well known and conventional manner as described in U.S. Pat. No. 2,751,616.

It should be noted that a plurality of optical projecting means may be selectively provided with varying magnification ratios. If this is desired, means must be provided to selectively vary the ratio of the speed of web 421 to the speed of filmstrip 411 in a corresponding manner. This may be accomplished by the proper positioning of the adjustable contact 187 of control voltage generator 18. In addition, exposure control means including shutter control apparatus may be disposed in the optical path between optical projecting means 404 and photoreceptor means 405.

It should be clear from the foregoing description that the present invention is effective to maintain a predetermined alignment between first and second moveable members to thereby synchronize the velocity of the first moveable member with the velocity of the second moveable member.

While the invention has been particularly shown and described with reference to a plurality of embodiments thereof, it will be obvious to those skilled in the art that the foregoing and various other changes and modifications in form and details may be made without departing from the spirit and scope of the invention. It is, therefore, intended that the appended claims be interpreted as including all such changes and modifications.

What is claimed is:

1. Apparatus for synchronizing the time of occurrence of a first pulse signal with the time of occurrence of a second pulse signal comprising:

first pulse signal generating means for generating said first pulse signal;

second pulse signal generating means for generating said second pulse signal;

first means coupled to said first and second pulse signal generating means and having a first state and a quiescent state, said first means being adapted to assume its first state when said first pulse signal is generated prior to the generation of said second pulse signal and to assume its quiescent state when said second pulse signal is generated, whereby the time duration of said first state is proportional to the time delay between said first and second pulse signals;

second means coupled to said first and second pulse signal generating means and having a first state and a quiescent state, said second means being adapted to assume its first state when said second pulse signal is generated prior to said first pulse signal and to assume its quiescent state when said first pulse signal is generated, whereby the time duration of said first state is proportional to the time delay between said second and first pulse signals;

first integrating means coupled to said first means for producing a first analog signal having an amplitude proportional to the integral of the time duration of the first state assumed by said first means;

second integrating means coupled to said second means for producing a second analog signal having an amplitude proportional to the integral of the time duration of the first state assumed by said second means;

first storage means coupled to said first integrating means for storing the maximum amplitude obtained by said first analog signal;

second storage means coupled to said second integrating means for storing the maximum amplitude obtained by said second analog signal;

combining means coupled to said first and second storage means for selectively producing a control signal above a predetermined threshold level in response to the maximum amplitude stored by said first storage means and below said predetermined threshold level in response to the maximum amplitude stored by said second storage means;

voltage controlled oscillating means coupled to said combining means for producing an oscillating signal having a frequency of oscillation determined by said control signal; and modifying means coupled to said first pulse signal generating means and responsive to said oscillating signal for modifying the time of occurrence of said first pulse signal in accordance with the frequency of oscillation of said oscillating signal whereby the magnitude of said control signal obtains said predetermined threshold level.

2. The apparatus of claim 1 wherein said combining means includes means for selectively establishing a ratio between the operating frequency of said first pulse signal generat means and the operating frequency of said second pulse signal generating means.

3. In apparatus for synchronizing the velocities of first and second movable members including driving means mechanically coupled to said first movable member, first and second detecting means for deriving first and second signals representative of the velocities of said first and second movable members, respectively, comparison means coupled to said first and second detecting means for determining the phase relationship between said first and second signals and feedback means coupled to said driving means for adjusting the speed of said driving means in accordance with said determined phase relationship, the improvement comprising:

control signal generating means coupled to said comparison means for applying to said feedback means a control signal having an amplitude proportional to said phase relationship and including means for selectively establishing a ratio between the velocity of said first and second movable members, said control signal generating means comprising analog signal integrating means coupled to said comparison means for generating a time dependent analog signal having an amplitude that selectively increases or decreases with the passing of time in accordance with a phase lagging or phase leading relationship, respectively;

sample and hold means coupled to said analog signal integrating means for sampling the amplitude of said time dependent analog signal and for storing the maximum amplitude obtained by said analog signal during an integrating cycle; and algebraic combining means coupled to said sample and hold means and to said means for selectively establishing a ratio between the velocities of said first and second movable members for generating said control signal.

4. The improvement of claim 3 wherein said means for selectively establishing a ratio between the velocities of said first and second moveable members comprises a source of variable voltage coupled to said algebraic combining means whereby said control signal admits of an amplitude that is an algebraic combination of said variable voltage and said stored maximum amplitude.

* * * * *

UNITED STATES PATENT AND TRADEMARK OFFICE
CERTIFICATE OF CORRECTION

PATENT NO. : 3,934,182
DATED : January 20, 1976
INVENTOR(S) : James M. Donohue et al It is certified that error appears in the above-identified patent and that said Letters Patent are hereby corrected as shown below:

In claim 2, line 4, delete "generat" and insert -- generating -- therefor.

Signed and Sealed this twenty-ninth Day of June 1976

[SEAL]

Attest:

RUTH C. MASON
Attesting Officer

C. MARSHALL DANN
Commissioner of Patents and Trademarks